United States Patent
Sato et al.

(10) Patent No.: US 12,079,225 B2
(45) Date of Patent: Sep. 3, 2024

(54) CONVERSATION INFORMATION GENERATION DEVICE THAT GENERATES SUPPLEMENTAL INFORMATION FOR SUPPLEMENTING A WORD

(71) Applicant: NTT DOCOMO, INC., Chiyoda-ku (JP)

(72) Inventors: Miyu Sato, Chiyoda-ku (JP); Kanako Oonishi, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 660 days.

(21) Appl. No.: 17/267,551

(22) PCT Filed: Aug. 1, 2019

(86) PCT No.: PCT/JP2019/030298
§ 371 (c)(1),
(2) Date: Feb. 10, 2021

(87) PCT Pub. No.: WO2020/054244
PCT Pub. Date: Mar. 19, 2020

(65) Prior Publication Data
US 2021/0191949 A1   Jun. 24, 2021

(30) Foreign Application Priority Data

Sep. 13, 2018 (JP) .................................. 2018-171818

(51) Int. Cl.
*G10L 15/22* (2006.01)
*G06F 16/2457* (2019.01)
(Continued)

(52) U.S. Cl.
CPC ........ *G06F 16/24575* (2019.01); *G06F 16/25* (2019.01); *G10L 15/26* (2013.01); *G10L 25/54* (2013.01); *G10L 2015/088* (2013.01)

(58) Field of Classification Search
CPC ... G10L 15/22; G10L 2015/088; G10L 15/02; G10L 16/288; G06F 40/247; G06F 40/30;
(Continued)

(56) References Cited

U.S. PATENT DOCUMENTS 6,324,513 B1 * 11/2001 Nagai ..................... G10L 15/22
704/E15.04
9,959,328 B2 * 5/2018 Jain ......................... G06F 40/30
(Continued)

FOREIGN PATENT DOCUMENTS

JP          9-198399 A        7/1997
JP          2013-73355 A      4/2013

OTHER PUBLICATIONS

International Search Report issued Sep. 24, 2019 in PCT/JP2019/030298 filed Aug. 1, 2019, citing documents AA-AB and AO-AP therein, 2 pages.
(Continued)

*Primary Examiner* — Jakieda R Jackson
(74) *Attorney, Agent, or Firm* — Oblon, McClelland, Maier & Neustadt, L.L.P.

(57) ABSTRACT

Provided is a conversation information generation device capable of easily generating supplemental information that supplements conversation information.
A conversation device (100) includes a graph database (106) that structurally stores a plurality of node information by using edge information indicating a mutual relationship. The conversation device (100) then extracts a word from text information to be supplemented, and determines whether the word is a specific word needed to be supplemented. When the word is determined as the specific word, the conversation device (100) references the graph database (106) and generates supplemental information for supplementing the word
(Continued)

on the basis of the edge information deriving from the node information coinciding with the word and of other node information.

19 Claims, 10 Drawing Sheets

(51) Int. Cl.
  *G06F 16/25*    (2019.01)
  *G10L 15/26*    (2006.01)
  *G10L 25/54*    (2013.01)
  *G10L 15/08*    (2006.01)
(58) Field of Classification Search
  CPC .... G06F 40/279; G06F 16/3344; G06F 40/40; G06F 16/367; G06F 16/285; G06F 16/9024; G06F 16/35; G06F 16/288; G06F 16/3329
  See application file for complete search history.

(56) References Cited

U.S. PATENT DOCUMENTS

| | | | |
|---|---|---|---|
| 2007/0050709 A1* | 3/2007 | Inose | G06F 3/0237 715/269 |
| 2007/0174258 A1* | 7/2007 | Jones | G06Q 30/02 |
| 2007/0233465 A1* | 10/2007 | Sato | G06F 40/211 704/10 |
| 2009/0318777 A1* | 12/2009 | Kameyama | G01C 21/3608 704/251 |
| 2010/0017381 A1* | 1/2010 | Watson | G06F 16/433 707/E17.101 |
| 2015/0057996 A1* | 2/2015 | Koinuma | G06F 40/129 704/9 |
| 2015/0066479 A1* | 3/2015 | Pasupalak | G06F 16/90332 704/9 |
| 2015/0135053 A1 | 5/2015 | Doornenbal et al. | |
| 2015/0179173 A1* | 6/2015 | Cho | G10L 15/26 704/235 |
| 2016/0371254 A1* | 12/2016 | Yamagami | G06N 3/047 |
| 2016/0378742 A1 | 12/2016 | Doornenbal et al. | |
| 2021/0327431 A1* | 10/2021 | Stewart | G06V 40/45 |

OTHER PUBLICATIONS

Notice of Reasons for Refusal issued Mar. 29, 2022 in Japanese Patent Application No. 2020-546747 (with English language translation), 10 pages.
International Preliminary Report on Patentability and Written Opinion issued Mar. 25, 2021 in PCT/JP2019/030298, 11 pages.

* cited by examiner

*Fig.2*

| TOPIC INFORMATION | CONVERSATION INFORMATION |
|---|---|
| SHINJI KAGAWA | Shinji Kagawa is a Japan national team player. |
| SHINJI KAGAWA | I am a fan of Shinji Kagawa. |
| SHINJI KAGAWA | Bill Kaulitz is a fan of Shinji Kagawa. |
| ... | ... |

*Fig.4*

| CATEGORY | PROPERTY LIST | TEMPLATE |
|---|---|---|
| PERSON | NATIONALITY/ OCCUPATION | [node information of topic information] is [edge information: node information of occupation] from [edge information: node information of nationality] |
| TOWN | COUNTRY/MAYOR | [node information of topic information] belongs to [edge information: node information of country], and a mayor is [edge information: node information of mayor] |
| MOVIE | DIRECTOR/ LEADING ACTOR/ RELEASE YEAR | ... |
| ... | ... | ... |

| TOPIC INFORMATION | CONVERSATION INFORMATION |
|---|---|
| SHINJI KAGAWA | Shinji Kagawa is a Japan national team player. |
| SHINJI KAGAWA | I am a fan of Shinji Kagawa. |
| SHINJI KAGAWA | Bill Kaulitz is a fan of Shinji Kagawa. |
| ... | ... |

(b)

| TOPIC INFORMATION | CONVERSATION INFORMATION |
|---|---|
| SHINJI KAGAWA | Shinji Kagawa is a Japan national team player. |
| SHINJI KAGAWA | I am a fan of Shinji Kagawa. |
| SHINJI KAGAWA | Bill Kaulitz is a fan of Shinji Kagawa.<br>Bill Kaulitz is a vocalist from Germany. |
| ... | ... |

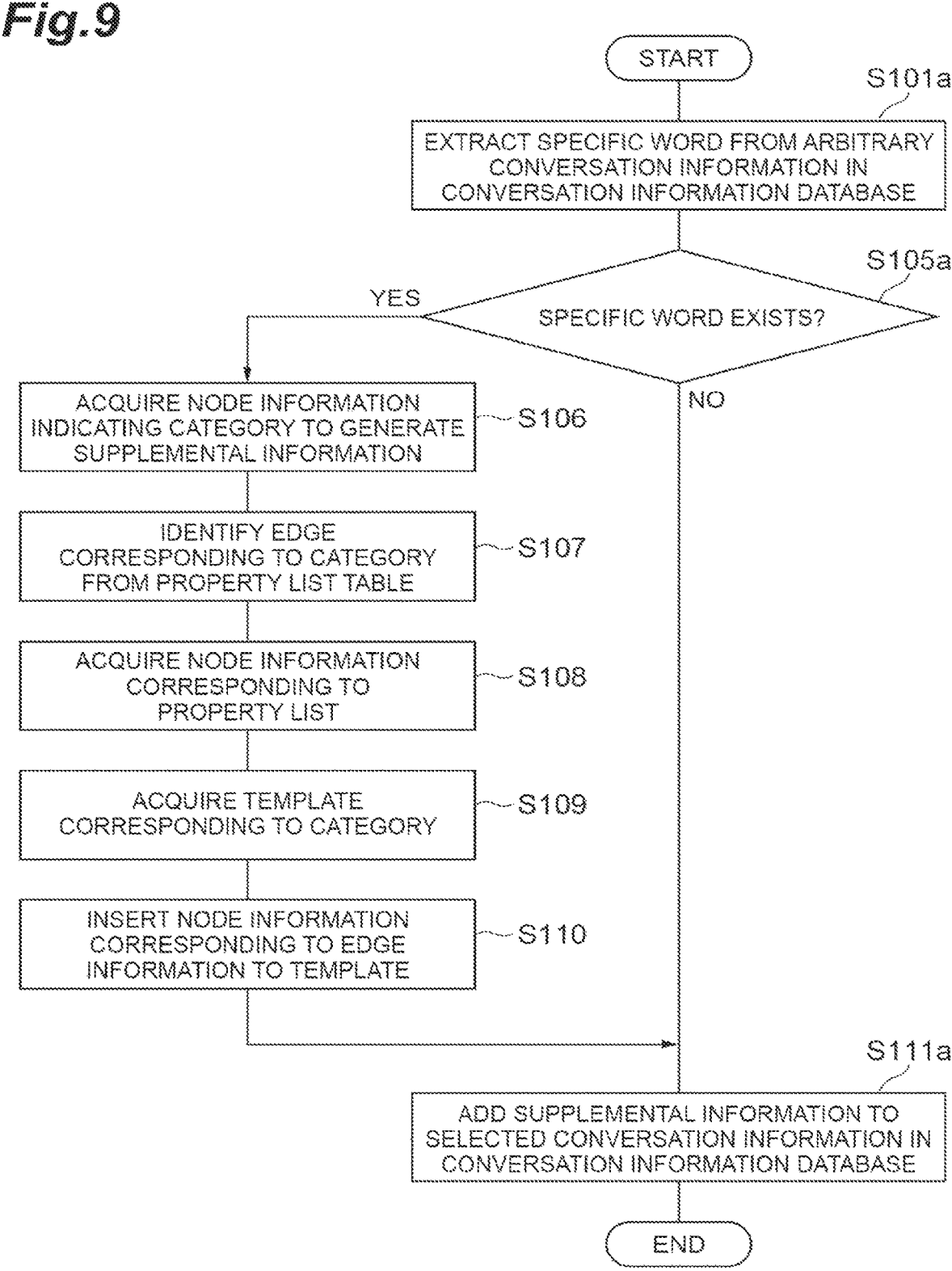

CONVERSATION INFORMATION GENERATION DEVICE THAT GENERATES SUPPLEMENTAL INFORMATION FOR SUPPLEMENTING A WORD

TECHNICAL FIELD

The present invention relates to a conversation information generation device that generates conversation information to make a conversation with a user.

BACKGROUND ART

Patent Literature 1 describes a technique to enable extracting and editing question-and-answer data and information such as a status and a condition to be added to their indices in a question-and-answer database that stores existing question-and-answer data.

CITATION LIST

Patent Literature

PTL1: International Patent Publication No. WO2006/085661

SUMMARY OF INVENTION

Technical Problem

However, in the technique described in Patent Literature 1, a user edits the question-and-answer database, which requires significant time and effort. Further, although in some cases there is a need to supplement conversation information based on the question-and-answer database in real time, the technique disclosed in Patent Literature 1 is incapable of supplementing conversation information in real time.

In view of the foregoing, in order to solve the above problem, an object of the present invention is to provide a conversation information generation device capable of easily generating supplemental information that supplements conversation information.

Solution to Problem

To solve the above-described problem, a conversation information generation device according to the present invention includes a storage unit configured to structurally store a plurality of registered words by using relationship information indicating a mutual relationship, an extraction unit configured to extract a word from text information to be supplemented, a determination unit configured to determine whether the word is a specific word needed to be supplemented on the basis of another registered word associated by the relationship information from a registered word corresponding to the extracted word among the plurality of registered words stored in the storage unit, and a supplemental information generation unit configured to, when the word is determined as the specific word, reference the storage unit and generate supplemental information for supplementing the word on the basis of the relationship information deriving from the registered word coinciding with the word and of another registered word.

In this configuration, when text information to be supplemented contains a rare word, for example, and it is determined that supplementation is necessary, supplemental information for supplementation is generated by referencing a storage unit and using registered words and relationship information.

Advantageous Effects of Invention

According to the present invention, supplemental information that supplements to conversation information is easily generated.

BRIEF DESCRIPTION OF DRAWINGS

FIG. 2 is a view showing a specific example of a conversation information database 105.

FIG. 4 is a view showing a specific example of a property list table 107.

FIG. 8 is a view showing a specific example of a conversation information database 105.

FIG. 9 is a flowchart showing the operation of the conversation information generation device 100a FIG. 10 is a view showing an example of the hardware configuration of the conversation device 100 or the conversation information generation device 100a according to one embodiment of the present disclosure.

DESCRIPTION OF EMBODIMENTS

Embodiments of the present invention are described hereinafter with reference to the attached drawings. Note that, where possible, the same elements are denoted by the same reference symbols and redundant description thereof is omitted.

First Embodiment

Figure 1:
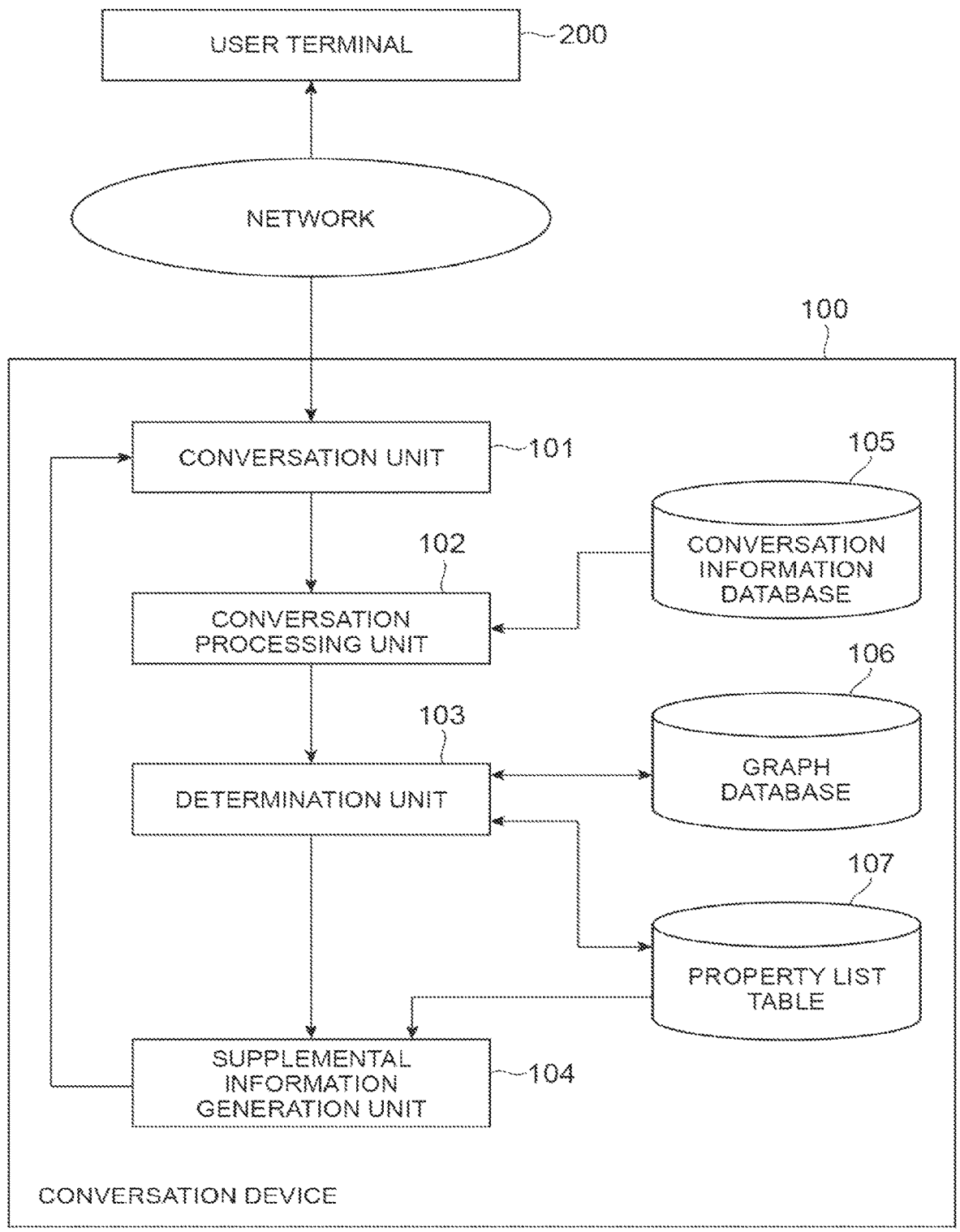
FIG. 1 is a block diagram showing the functional configuration of a conversation device 100 according to a first embodiment of the present disclosure.

FIG. 1 is a block diagram showing the functional configuration of a conversation device 100 according to a first embodiment of the present disclosure. As shown in FIG. 1, the conversation device 100 receives speech information from a user terminal 200 and transmits conversation information in response to this speech information, and thereby a user of the user terminal 200 can enjoy a conversation. The conversation device 100 has a conversation information generation function (conversation information generation device) and, when needed, generates supplemental information for supplementing conversation information and transmits the supplemental information together with the conversation information.

As shown in FIG. 1, this conversation device 100 includes a conversation unit 101, a conversation processing unit 102, a determination unit 103, a supplemental information generation unit 104, a conversation information database 105, a graph database 106, and a property list table 107. Note that the conversation information database 105 is not necessarily included in the conversation device 100. For example, the conversation device 100 may be configured to be accessible to the conversation information database 105 located in an external network, and acquire the conversation information from the conversation information database 105 when needed.

The conversation unit 101 is a part that receives text information, which is speech information transmitted from the user terminal 200, and transmits text information, which is conversation information to be provided to the user terminal 200. Although the conversation unit 101 transmits and receives information to and from the user terminal 200 via a network in FIG. 1, it is not limited thereto, and it may make a direct conversation. In this case, a conversation by voice or a conversation by input/output of text information is made.

The conversation processing unit 102 is a part that analyzes the text information transmitted from the user terminal 200 and extracts focus information (topic information), which is the subject of the speech information. The focus information is information that is extracted on the basis of a feature vector (semantic vector) in a word and characters before and after the word, which is obtained by morphological analysis of the text information, and it is represented by a word or text. Extraction of the focus information is a known technique. The focus information is hereinafter referred to as topic information.

Further, the conversation processing unit 102 is a part that searches the conversation information database 105 by using the extracted topic information as a key, and thereby acquires the conversation information corresponding to the topic information.

The determination unit 103 performs morphological analysis of the conversation information acquired by the conversation processing unit 102, and thereby extracts one or a plurality of words. The determination unit 103 determines whether each of the extracted one or plurality of words is a rare word or not by referencing the graph database 106. As described later, the graph database 106 is a database that structurally stores node information, which is registered words, in association with each other by edge information.

As criteria to determine whether the extracted word is rare information, the determination unit 103 makes a determination on the basis of the number of edge information (or other node information) heading to the node information corresponding to this word in the graph database 106. When the number of edge information heading to the node information is small, such as less than 30, for example, it can be determined that this node information is not referred to by other node information. In other words, it can be determined that this node information is information that is not generally known.

Note that the determination unit 103 does not determine the node information extracted from speech uttered by a user as rare information even when it can be determined as rare information. For example, the conversation device 100 may include a history information storage unit that stores, as history information, words (node information) obtained from the speech information of a user extracted by the conversation processing unit 102, and the determination unit 103 may refrain from determining the words stored as the history information as rare information even when the above-described condition is satisfied. In this embodiment, a rare word is referred to hereinafter as a specific word.

The supplemental information generation unit 104 generates supplemental information that supplements a word determined as the specific word by the determination unit 103 by referencing the graph database 106 and the property list table 107. The details of this processing are described later.

The conversation information database 105 is a database that associates the topic information with the conversation information. FIG. 2 shows a specific example of this database. As shown in FIG. 2, the topic information and the conversation information are associated with each other and, for example, the conversation information: "Shinji Kagawa is a Japan national team player" is associated with the topic information: Shinji Kagawa. This conversation information database 105 is configured to allow the conversation processing unit 102 to extract the corresponding conversation information by using the topic information as a key.

Figure 3:
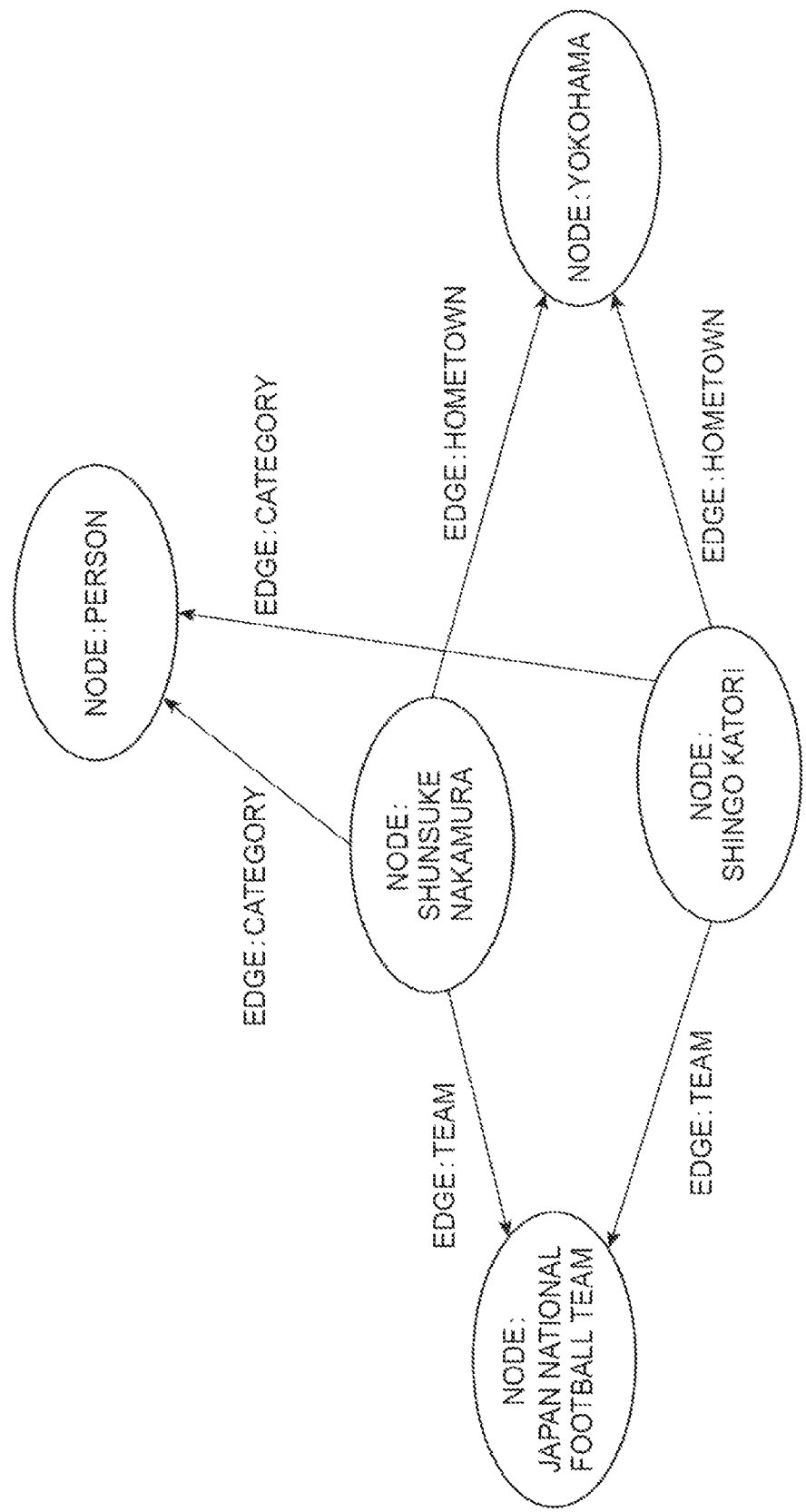
FIG. 3 is a view schematically showing a specific example of a graph database 106.

The graph database 106 is a database that structurally stores the node information, which is registered words, and the edge information in association with each other. FIG. 3 is a view schematically showing a specific example of the graph database 106. The graph database 106 structurally describes a plurality of registered words by using relationship information indicating a mutual relationship, and it describes information indicating a connection between a word and a word. As shown in FIG. 3, a word is treated as the node information, and a connection between the node information is indicated by the edge information. For example, other node information: Yokohama derives from the node information: Shunsuke Nakamura by using the edge information: hometown. This indicates that the node information: Yokohama is associated as a hometown of Shunsuke Nakamura. In other words, the node information: Shunsuke Nakamura and the node information: Yokohama are associated by the edge information: hometown. The deriving direction of the node information is indicated by the arrow in FIG. 2. The node information that derives from certain node information is information that describes this certain node information, and therefore the deriving information is defined. Further, in this embodiment, the deriving direction is used to determine whether the node information is a specified word or not.

The property list table 107 is a part that stores information for generating the supplemental information. FIG. 4 shows a specific example of the property list table 107. As shown in the figure, this property list table 107 stores a category, a property list, and a supplemental information template in association with one another. The category is information indicated by the edge information, and the node information identified by the edge information: category is described in this category field. The property list shows the edge information for identifying the node information for supplementation that supplements the node information. The edge information identified by this property list and its node information are information for supplementing the node information that is rare.

For example, in FIG. 4, the property list "nationality" and "occupation", and the supplemental information template are associated with the category "person". The supplemental information template in this case is "[node information determined to be rare] is [node information indicating occupation] from [node information indicating nationality]".

Figure 6:
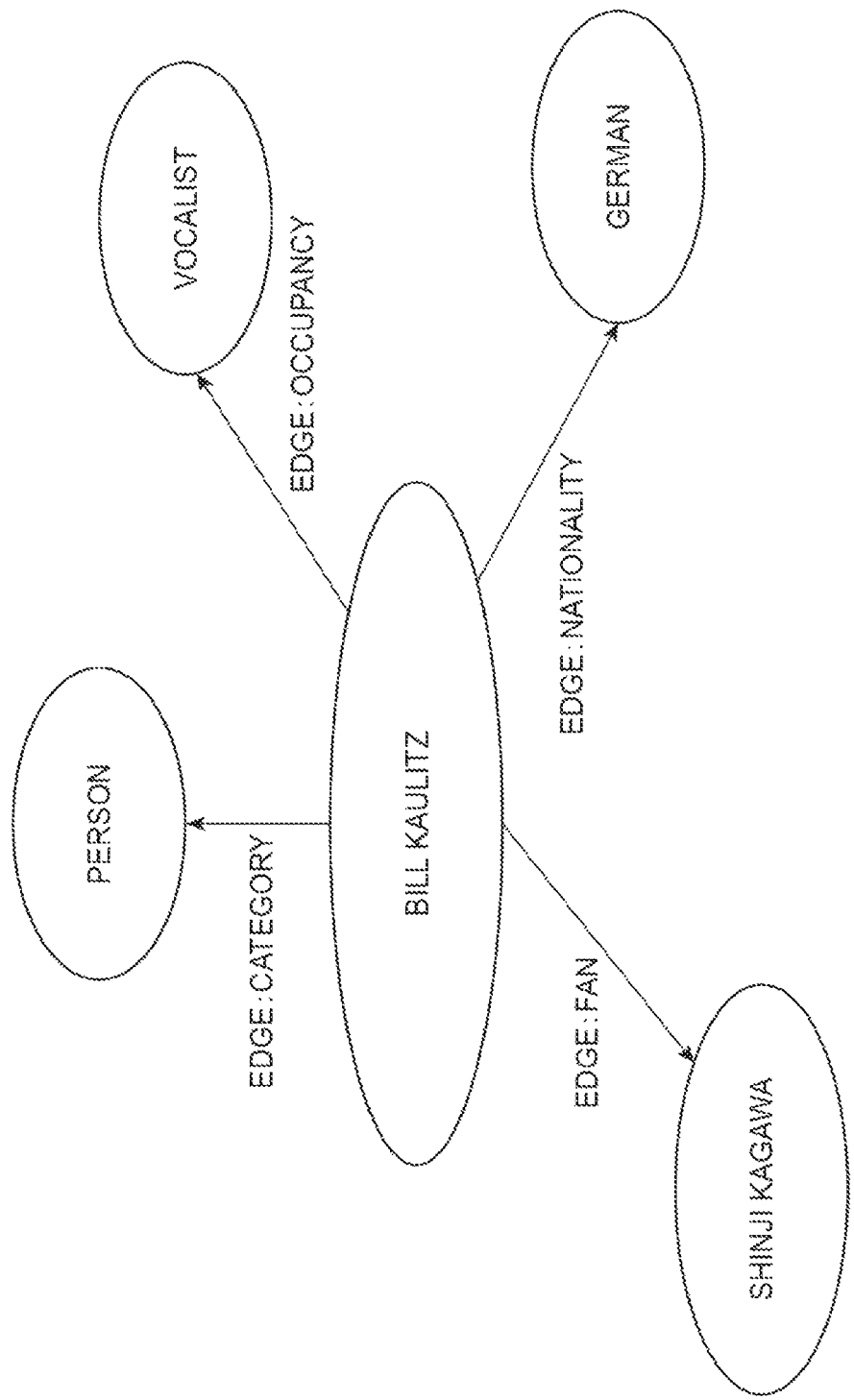
FIG. 6 is a view schematically showing a specific example of a specific word for which supplemental information is needed in the graph database 106.

The operation of the conversation device 100 configured as described above is described hereinafter. Prior to describing the operation, conditions assumed in this embodiment are described with reference to FIG. 6. FIG. 6 is a schematic view showing a part of the graph database 106. The node information: Shinji Kagawa derives from the node information: Bill Kaulitz by the edge information: fan. It is assumed that Bill Kaulitz is a person who is less well-known in Japan, and stored as a less well-known person in the graph database 106.

In the case of having the above-described graph database 106, assume that the conversation device 100 outputs "Bill Kaulitz is a fan of Shinji Kagawa" as the conversation information to be provided to a user. Since Bill Kaulitz is a person who is less well-known in Japan as described above, the user cannot understand it in some cases.

Therefore, it is necessary to generate a supplemental sentence that supplements Bill Kaulitz. This processing is described hereinafter with reference to FIG. 5.

Figure 5:
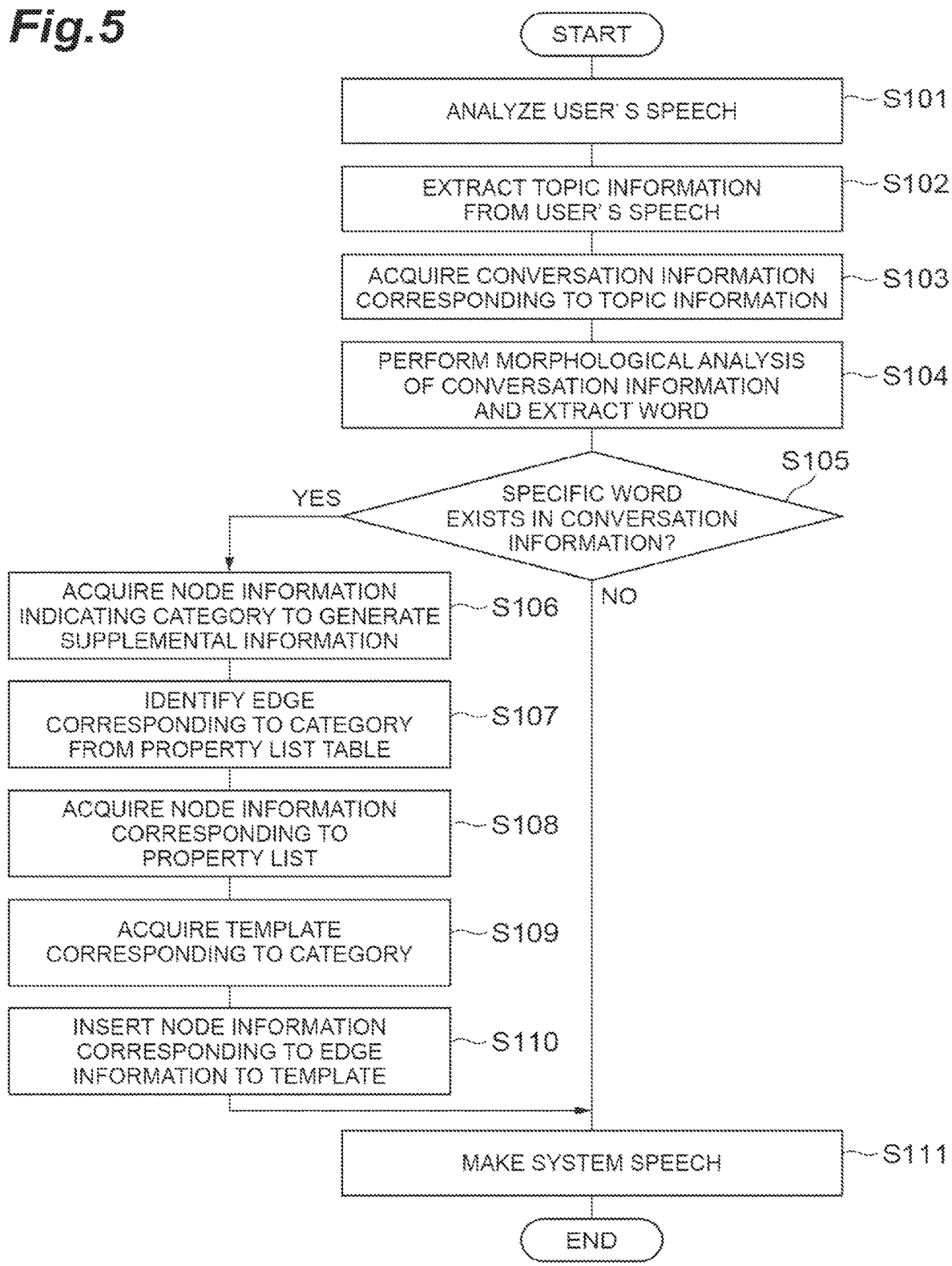
FIG. 5 is a flowchart showing the operation of the conversation device 100.

FIG. 5 is a flowchart showing the operation of the conversation device 100. In the conversation device 100, when the conversation unit 101 receives speech information from the user terminal 200, the conversation processing unit 102 analyzes this speech information (S101). The conversation processing unit 102 extracts topic information from the speech information of the user (S102). In this example, the topic information: Shinji Kagawa is extracted.

The conversation processing unit 102 acquires conversation information corresponding to the topic information from the conversation information database 105 (S103). In this example, the conversation information "Bill Kaulitz is a fan of Shinji Kagawa" is acquired.

Further, the determination unit 103 performs morphological analysis of the acquired conversation information and extracts one or a plurality of words (S104). In this example, the word: Bill Kaulitz is extracted. The determination unit 103 references the graph database 106 by using the extracted one or plurality of words as a key, and thereby determines whether the extracted word is the specific word or not (S105).

When it is determined that the specific word is contained in the conversation information (Yes in S105), the supplemental information generation unit 104 acquires the node information that derives from the node information of the specific word by the edge information: category in order to generate supplemental information. To be specific, the supplemental information generation unit 104 first acquires the node information that derives from the node information of the specific word by the edge information: category by using the property list table 107 (S106). As shown in FIG. 6, the information that derives from the node information: Bill Kaulitz, which is the specific word, by the edge information: category is the node information: person. This makes it known that Bill Kaulitz is a person.

Further, the supplemental information generation unit 104 references the property list table and identifies the edge information for identifying the node information for supplementation on the basis of the edge information: category of the node information (S107). In the example of FIG. 4, the property list in the case where the category of the node information is a person is the edge information: nationality/occupation.

Then, the supplemental information generation unit 104 acquires the node information for supplementation that derives from the node information, which is the specific word, by the edge information identified in S107 (S108). As shown in FIG. 6, the node information for supplementation that derives from the node information: Bill Kaulitz, which is the specific word, by the edge information: nationality and occupation is the node information: Germany and vocalist, respectively. Thus, the supplemental information generation unit 104 can generate the supplemental information indicating that Bill Kaulitz is from Germany and is a vocalist.

The supplemental information generation unit 104 references the property list table 107 and acquires a template corresponding to the category of the node information, which is the specific word (S109). In the example of FIG. 4, since the category of the specific word is "person", the supplemental information generation unit 104 acquires the supplemental information template corresponding to "person". Then, the supplemental information generation unit 104 inserts the node information for supplementation to the acquired supplemental information template, and thereby generates the conversation information to serve as the supplemental information (S110). In the example of FIG. 4, the supplemental information template is "[topic information] is [edge information: node information of occupation] from [edge information: node information of nationality]", and therefore the conversation information to serve as the supplemental information is generated by inserting each of the node information.

The conversation unit 101 transmits the conversation information acquired by the conversation processing unit 102 from the conversation information database 105 and the supplemental information generated by the supplemental information generation unit 104 to the user terminal 200 and thereby makes a system speech. Further, when the result is No in Step S105, the conversation unit 101 transmits the conversation information acquired by the conversation processing unit 102 from the conversation information database 105 to the user terminal 200 and thereby makes a system speech (S111).

By performing this processing, even when the specific word that is difficult to be understood by a user is contained, the user can enjoy a conversation in a natural way by generating the supplemental information that supplements this specific word.

Second Embodiment

A second embodiment is described hereinafter. While the conversation device 100 according to the above-described embodiment generates the supplemental information that supplements the conversation information obtained by using the conversation information database 105 and transmits it as the conversation information, a conversation information generation device 100*a* according to the second embodiment is a device that registers supplemental information beforehand when the conversation information stored in the conversation information database 105 needs to be supplemented.

Figure 7:
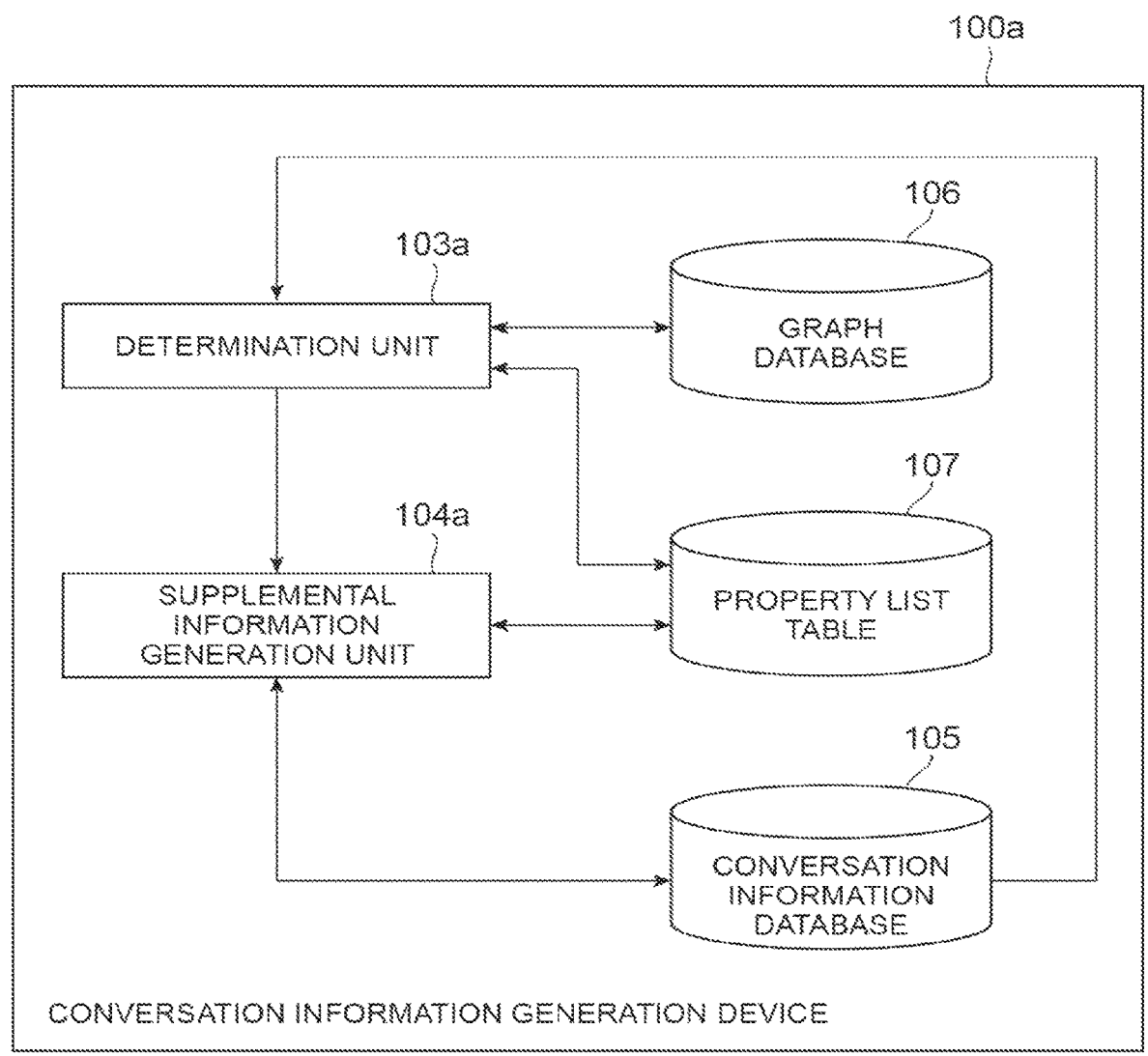
FIG. 7 is a block diagram showing the functional configuration of a conversation information generation device 100a according to a second embodiment of the present disclosure.

FIG. 7 is a block diagram showing the functional configuration of a conversation information generation device 100*a* according to a second embodiment of the present disclosure. As shown in FIG. 7, the conversation information generation device 100*a* includes a determination unit 103*a*, a supplemental information generation unit 104*a*, a conversation information database 105, a graph database 106, and a property list table 107. The description of the elements denoted by the same reference symbols as in the conversation device 100 according to the first embodiment is omitted. The conversation information database 105 is not necessarily included in the conversation information generation device 100*a*. For example, the conversation information generation device 100*a* may be configured to be accessible to the conversation information database 105 located in an external network and update the conversation information database 105 when needed.

The determination unit 103*a* acquires the conversation information prepared for each topic information from the conversation information database 105, performs morphological analysis of this conversation information and thereby extracts one or a plurality of words. The determination unit 103a then determines whether each of the extracted one or plurality of words is a rare word or not by referencing the graph database 106. Criteria for determination are the same as those of the determination unit 103.

The supplemental information generation unit 104a generates supplemental information that supplements the word determined as the specific word by the determination unit 103a by referencing the graph database 106 and the property list table 107. The details of this processing are the same as those in the first embodiment described above.

Note that the supplemental information generation unit 104a adds the supplemental information generated on the basis of the acquired conversation information to this conversation information, and stores the information into the conversation information database 105. In this addition, a conjunction may be inserted as appropriate.

FIG. 8 shows a specific example of the conversation information database 105. FIG. 8(*a*) is a specific example showing the conversation information database 105 before addition of the supplemental information, and FIG. 8(*b*) is a specific example showing the conversation information database 105 after addition of the supplemental information.

As shown in FIG. 8(*b*), the supplemental information "Bill Kaulitz is a vocalist from Germany" is added to the conversation information "Bill Kaulitz is a fan of Shinji Kagawa". Since the supplemental information is added on the basis of the graph database 106 in the conversation information database 105, higher quality conversation information is provided.

The operation of the conversation information generation device 100a is described hereinafter. FIG. 9 is a flowchart showing this operation. The determination unit 103a selects one conversation information from the conversation information database 105, and extracts one or a plurality of words from the conversation information (S101a).

The determination unit 103a references the graph database 106 by using the extracted one or plurality of words as a key, and thereby determines whether the extracted word is the specific word or not (S105)

The supplemental information generation unit 104a generates the supplemental information for the specific word. The generation process is the same as in the first embodiment, and the supplemental information is generated by performing processing of Steps S106 to S110 (S106 to S110).

The supplemental information generation unit 104a adds the generated supplemental information to the selected one conversation information (S111a). In this addition, a conjunction may be inserted as appropriate.

After determining whether the supplemental information is needed for one conversation information and making addition according to this determination, the conversation information generation device 100a makes determination as to whether the generation of the supplemental information is needed for next another conversation information and generates the supplemental information when needed. This processing is performed on all of the conversation information stored in the conversation information database 105, which improves the quality of the conversation information database 105.

[Operations and Effects of Embodiment]

The operations and effects of the conversation device 100 and the conversation information generation device 100a according to the first embodiment and the second embodiment are described hereinafter. The conversation device 100 according to the first embodiment and the conversation information generation device 100a according to the second embodiment include a storage unit that structurally stores the node information, which is a plurality of registered words, by using the edge information, which is relationship information indicating a mutual relationship. This storage unit is the graph database 106. Then, the conversation device 100 (or the conversation information generation device 100a) extracts a word (for example, Bill Kaulitz) from the text information to be supplemented, and determines whether this word is the specific word that needs to be supplemented on the basis of other node information associated by the edge information from the node information corresponding to the extracted word among the plurality of stored node information. Although this specific word is one indicating whether it is a rare word or not in the above-described embodiment, it is not limited thereto, and it may be one simply indicating whether supplementation is necessary or not.

Then, when the conversation device 100 (conversation information generation device 100a) determines that the extracted word is the specific word, it references the graph database 106 and generates supplemental information that supplements the word on the basis of the edge information that derives from the node information that coincides with the word and of other node information.

In this configuration, when text information to be supplemented contains a rare word, for example, and it is determined that supplementation is necessary, supplemental information for supplementation is generated by referencing the graph database 106 and using the node information and the edge information. This generation of supplemental information is done relatively easily and quickly, which enables real-time supplementation.

The conversation device 100 according to the first embodiment further includes the conversation information database 105 that stores text information, which is conversation information in response to speech information transmitted from the user terminal 200, and the conversation processing unit 102 that acquires the speech information transmitted from the user terminal 200 and acquires the text information, which is the conversation information in response to this speech information, from the conversation information database 105 and transmits the information.

Then, the conversation processing unit 102 that serves as an extraction unit extracts a word from the text information acquired by the conversation unit 101 and acquires the corresponding conversation information, the determination unit 103 and the supplemental information generation unit 104 generate supplemental information, and the conversation unit 101 transmits the conversation information and the supplemental information to the user terminal 200.

This configuration enables easy generation of supplemental information that supplements conversation information and further notifies a user of the supplemental information along with the conversation information. This enables supplementation while making a conversation.

First, the conversation device 100 according to the first embodiment further includes a history database that stores a history of speech words contained in speech information transmitted from the user terminal 200. When determining the specific word, the determination unit 103 does not determine, as the specific word, a word that coincides with the speech word transmitted from the user terminal 200.

Even if a word uttered by a user needs to be supplemented in general, this word does not need to be supplemented since it is a word uttered by this user. Therefore, such a word is not treated as the specific word, and supplemental information is not generated. This achieves a natural conversation without unnecessary information.

The conversation information generation device 100a according to the second embodiment is configured to be accessible to the conversation information database 105 that stores topic information, which is a predetermined primary word, and text information, which is conversation information to be provided to a user terminal, in association with each other. The conversation information database 105 may be included in the device or may be located in an external server.

Then, the determination unit 103a extracts a word from the text information stored in the conversation information database 105, and the supplemental information generation unit 104a generates supplemental information by referencing the graph database 106 and the property list table 107. The supplemental information generation unit 104a then adds the generated supplemental information to the conversation information database 105.

Particularly, the supplemental information generation unit 104 adds the supplemental information to the text information from which the word is extracted, which is stored in the conversation information database 105.

This configuration enables updating, without manpower, the conversation information stored in the conversation information database 105 that has been already built and thereby improves its quality.

The conversation device 100 or the conversation information generation device 100a preferably has the following configuration in order to generate the supplemental information.

Specifically, the conversation device 100 or the conversation information generation device 100a further includes the property list table 107 associating node information (node information: person) serving as a relationship word associated by relationship information (e.g., edge information: category) indicating a predetermined relationship, a supplemental information template for generating supplemental information, and a property list indicating relationship information for supplementation (edge information: birthday) for deriving a supplemental word (node information: month and day) to be inserted to this supplemental information template.

Then, the supplemental information generation unit 104 extracts, from the graph database 106, the node information serving as the relationship word associated by the predetermined edge information (e.g., category) from the node information that coincides with the word.

The supplemental information generation unit 104 extracts, from the property list table 107, the property list and the supplemental information template corresponding to the node information, which is the relationship word.

Further, the supplemental information generation unit 104 extracts, as node information to serve as a supplemental word, the node information based on the edge information, which is the relationship information for supplementation specified by the property list, which is stored in the graph database 106.

The supplemental information generation unit 104 inserts the extracted supplemental word to the supplemental information template and thereby generates supplemental information.

This configuration enables determining a supplemental word on the basis of node information determined beforehand by the edge information, such as the category of a word to be supplemented. Although "category" is used as an example of the edge information indicating a specified relationship in this embodiment, it is not limited thereto. Any information may be used as long as it is the edge information that is highly relevant in terms of supplementing the specific word.

Further, the determination unit 103 (or the determination unit 103a) references the graph database 106, and when the node information corresponding to a word is associated by the edge information from a predetermined number or less of other node information, determines this word as the specific word. This is because the node information that is less associated with other node information can be determined as the node information that is generally unknown.

This configuration enables determination of the specific word by simple processing.

The block diagram used for the description of the above embodiments shows blocks of functions. Those functional blocks (component parts) are implemented by any combination of at least one of hardware and software. Further, a means of implementing each functional block is not particularly limited. Specifically, each functional block may be implemented by one physically or logically combined device or may be implemented by two or more physically or logically separated devices that are directly or indirectly connected (e.g., by using wired or wireless connection etc.). The functional blocks may be implemented by combining software with the above-described one device or the above-described plurality of devices.

The functions include determining, deciding, judging, calculating, computing, processing, deriving, investigating, looking up/searching/inquiring, ascertaining, receiving, transmitting, outputting, accessing, resolving, selecting, choosing, establishing, comparing, assuming, expecting, considering, broadcasting, notifying, communicating, forwarding, configuring, reconfiguring, allocating/mapping, assigning and the like, though not limited thereto. For example, the functional block (component part) that implements the function of transmitting is referred to as a transmitting unit or a transmitter. In any case, a means of implementation is not particularly limited as described above.

Figure 10:
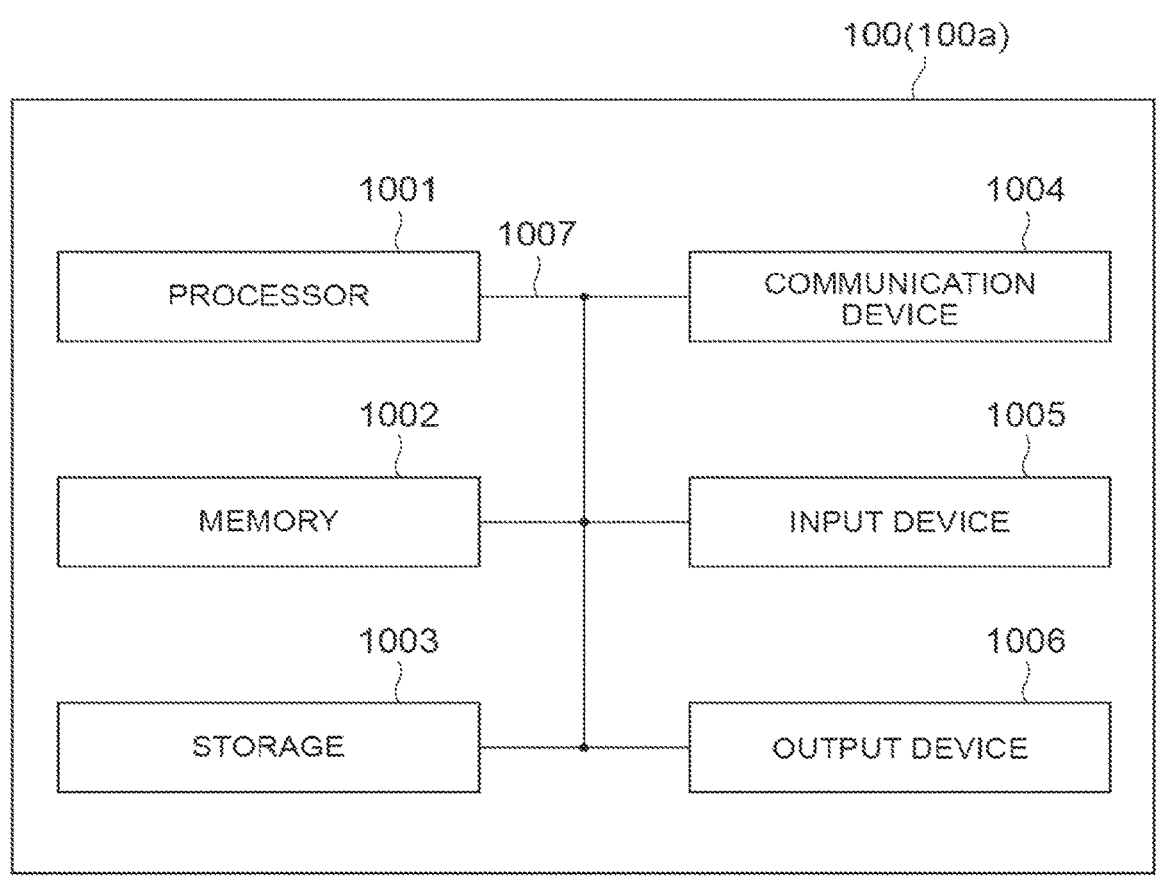

For example, the conversation device 100, the conversation information generation device 100a and the like according to one embodiment of the present disclosure may function as a computer that performs processing of a conversation method or a conversation information generation method according to the present disclosure. FIG. 10 is a view showing an example of the hardware configuration of the conversation device 100 or the conversation information generation device 100a according to one embodiment of the present disclosure. The conversation device 100 or the conversation information generation device 100a described above may be physically configured as a computer device that includes a processor 1001, a memory 1002, a storage 1003, a communication device 1004, an input device 1005, an output device 1006, a bus 1007 and the like.

In the following description, the term "device" may be replaced with a circuit, a device, a unit, or the like. The hardware configuration of the conversation device 100 or the conversation information generation device 100a may be configured to include one or a plurality of the devices shown in the drawings or may be configured without including some of those devices.

The functions of the conversation device 100 or the conversation information generation device 100a may be implemented by loading predetermined software (programs)

on hardware such as the processor 1001 and the memory 1002, so that the processor 1001 performs computations to control communications by the communication device 1004 and control at least one of reading and writing of data in the memory 1002 and the storage 1003.

The processor 1001 may, for example, operate an operating system to control the entire computer. The processor 1001 may be configured to include a CPU (Central Processing Unit) including an interface with a peripheral device, a control device, an arithmetic device, a register and the like. For example, the conversation processing unit 102, the determination unit 103, the supplemental information generation unit 103 and the like described above may be implemented by the processor 1001.

Further, the processor 1001 loads a program (program code), a software module and data from at least one of the storage 1003 and the communication device 1004 into the memory 1002 and performs various processing according to them. As the program, a program that causes a computer to execute at least some of the operations described in the above embodiments is used. For example, the conversation processing unit 102, the determination unit 103, and the supplemental information generation unit 104 of the conversation device 100 or the determination unit 103a and the supplemental information generation unit 104a of the supplemental information generation unit 104a and the like may be implemented by a control program that is stored in the memory 1002 and operates on the processor 1001, and the other functional blocks may be implemented in the same way. Although the above-described processing is executed by one processor 1001 in the above description, the processing may be executed simultaneously or sequentially by two or more processors 1001. The processor 1001 may be implemented in one or more chips. Note that the program may be transmitted from a network through a telecommunications line.

The memory 1002 is a computer-readable recording medium, and it may be composed of at least one of ROM (Read Only Memory), EPROM (ErasableProgrammable ROM), EEPROM (Electrically ErasableProgrammable ROM), RAM (Random Access Memory) and the like, for example. The memory 1002 may be also called a register, a cache, a main memory (main storage device) or the like. The memory 1002 can store a program (program code), a software module and the like that can be executed for implementing a conversation method according to one embodiment of the present disclosure.

The storage 1003 is a computer-readable recording medium, and it may be composed of at least one of an optical disk such as a CD-ROM (Compact Disk ROM), a hard disk drive, a flexible disk, a magneto-optical disk (e.g., a compact disk, a digital versatile disk, and a Blu-ray (registered trademark) disk), a smart card, a flash memory (e.g., a card, a stick, and a key drive), a floppy (registered trademark) disk, a magnetic strip and the like, for example. The storage 1003 may be called an auxiliary storage device. The above-described storage medium may be a database, a server, or another appropriate medium including the memory 1002 and/or the storage 1003, for example.

The communication device 1004 is hardware (a transmitting and receiving device) for performing communication between computers via at least one of a wired network and a wireless network, and it may also be referred to as a network device, a network controller, a network card, a communication module, or the like. The communication device 1004 may include a high-frequency switch, a duplexer, a filter, a frequency synthesizer or the like in order to implement at least one of FDD (Frequency Division Duplex) and TDD (Time Division Duplex), for example. For example, the above-described conversation unit 101 or the like may be implemented by the communication device 1004. The conversation unit 101 may be implemented in such a way that a transmitting unit and a receiving unit are physically or logically separated.

The input device 1005 is an input device (e.g., a keyboard, a mouse, a microphone, a switch, a button, a sensor, etc.) that receives an input from the outside. The output device 1006 is an output device (e.g., a display, a speaker, an LED lamp, etc.) that makes output to the outside. Note that the input device 1005 and the output device 1006 may be integrated (e.g., a touch panel).

In addition, the devices such as the processor 1001 and the memory 1002 are connected by the bus 1007 for communicating information. The bus 1007 may be a single bus or may be composed of different buses between different devices.

Further, the conversation device 100 or the conversation information generation device 100a may include hardware such as a microprocessor, a DSP (Digital Signal Processor), an ASIC (Application Specific Integrated Circuit), a PLD (Programmable Logic Device), and an FPGA (Field Programmable Gate Array), and some or all of the functional blocks may be implemented by the above-described hardware components. For example, the processor 1001 may be implemented with at least one of these hardware components.

Notification of information may be made by another method, not limited to the aspects/embodiments described in the present disclosure. For example, notification of information may be made by physical layer signaling (e.g., DCI (Downlink Control Information), UCI (Uplink Control Information)), upper layer signaling (e.g., RRC (Radio Resource Control) signaling, MAC (Medium Access Control) signaling, annunciation information (MIB (Master Information Block), SIB (System Information Block))), another signal, or a combination of them. Further, RRC signaling may be called an RRC message, and it may be an RRC Connection Setup message, an RRC Connection Reconfiguration message or the like, for example.

Further, each of the aspects/embodiments described in the present disclosure may be applied to at least one of a system using LTE (Long Term Evolution), LTE-A (LTE Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra Wide Band), Bluetooth (registered trademark), or another appropriate system and a next generation system extended on the basis of these systems. Further, a plurality of systems may be combined (e.g., a combination of at least one of LTE and LTE-A, and 5G) for application.

The procedure, the sequence, the flowchart and the like in each of the aspects/embodiments described in the present disclosure may be in a different order unless inconsistency arises. For example, for the method described in the present disclosure, elements of various steps are described in an exemplified order, and it is not limited to the specific order described above.

The information or the like can be output from an upper layer (or lower layer) to a lower layer (or upper layer). It may be input and output through a plurality of network nodes.

Input/output information or the like may be stored in a specific location (e.g., memory) or managed in a management table. Further, input/output information or the like can be overwritten or updated, or additional data can be written. Output information or the like may be deleted. Input information or the like may be transmitted to another device.

The determination may be made by a value represented by one bit (0 or 1), by a truth-value (Boolean: true or false), or by numerical comparison (e.g., comparison with a specified value).

Each of the aspects/embodiments described in the present disclosure may be used alone, may be used in combination, or may be used by being switched according to the execution. Further, a notification of specified information (e.g., a notification of "being X") is not limited to be made explicitly, and it may be made implicitly (e.g., a notification of the specified information is not made).

Although the present disclosure is described in detail above, it is apparent to those skilled in the art that the present disclosure is not restricted to the embodiments described in this disclosure. The present disclosure can be implemented as a modified and changed form without deviating from the spirit and scope of the present disclosure defined by the appended claims. Accordingly, the description of the present disclosure is given merely by way of illustration and does not have any restrictive meaning to the present disclosure.

Software may be called any of software, firmware, middleware, microcode, hardware description language or another name, and it should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function and the like.

Further, software, instructions and the like may be transmitted and received via a transmission medium. For example, when software is transmitted from a website, a server or another remote source using at least one of wired technology (a coaxial cable, an optical fiber cable, a twisted pair and a digital subscriber line (DSL) etc.) and wireless technology (infrared rays, microwave etc.), at least one of those wired technology and wireless technology are included in the definition of the transmission medium.

The information, signals and the like described in the present disclosure may be represented by any of various different technologies. For example, data, an instruction, a command, information, a signal, a bit, a symbol, a chip and the like that can be referred to in the above description may be represented by a voltage, a current, an electromagnetic wave, a magnetic field or a magnetic particle, an optical field or a photon, or an arbitrary combination of them.

Note that the term described in the present disclosure and the term needed to understand the present disclosure may be replaced by a term having the same or similar meaning. For example, at least one of a channel and a symbol may be a signal (signaling). Further, a signal may be a message. Furthermore, a component carrier (CC) may be called a cell, a frequency carrier, or the like.

The terms "system" and "network" used in the present disclosure are used to be compatible with each other.

Further, information, parameters and the like described in the present disclosure may be represented by an absolute value, a relative value to a specified value, or corresponding different information. For example, radio resources may be indicated by an index.

The names used for the above-described parameters are not definitive in any way. Further, mathematical expressions and the like using those parameters are different from those explicitly disclosed in the present disclosure in some cases. Because various channels (e.g., PUCCH, PDCCH etc.) and information elements (e.g., TPC etc.) can be identified by every appropriate names, various names assigned to such various channels and information elements are not definitive in any way.

In the present disclosure, the terms such as "Mobile Station (MS)" "user terminal", "User Equipment (UE)" and "terminal" can be used to be compatible with each other.

The mobile station can be also called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or several other appropriate terms.

Note that the term "determining" and "determining" used in the present disclosure includes a variety of operations. For example, "determining" and "determining" can include regarding the act of judging, calculating, computing, processing, deriving, investigating, looking up/searching/inquiring (e.g., looking up in a table, a database or another data structure), ascertaining or the like as being "determined" and "determined". Further, "determining" and "determining" can include regarding the act of receiving (e.g., receiving information), transmitting (e.g., transmitting information), inputting, outputting, accessing (e.g., accessing data in a memory) or the like as being "determined" and "determined". Further, "determining" and "determining" can include regarding the act of resolving, selecting, choosing, establishing, comparing or the like as being "determined" and "determined". In other words, "determining" and "determining" can include regarding a certain operation as being "determined" and "determined". Further, "determining (determining)" may be replaced with "assuming", "expecting", "considering" and the like.

The term "connected", "coupled" or every transformation of this term means every direct or indirect connection or coupling between two or more elements, and it includes the case where there are one or more intermediate elements between two elements that are "connected" or "coupled" to each other. The coupling or connection between elements may be physical, logical, or a combination of them. For example, "connect" may be replaced with "access". When used in the present disclosure, it is considered that two elements are "connected" or "coupled" to each other by using at least one of one or more electric wires, cables, and printed electric connections and, as several non-definitive and non-comprehensive examples, by using electromagnetic energy such as electromagnetic energy having a wavelength of a radio frequency region, a microwave region and an optical (both visible and invisible) region.

The description "on the basis of" used in the present disclosure does not mean "only on the basis of" unless otherwise noted. In other words, the description "on the basis of" means both of "only on the basis of" and "at least on the basis of".

When the terms such as "first" and "second" are used in the present disclosure, any reference to the element does not limit the amount or order of the elements in general. Those terms can be used in the present disclosure as a convenient way to distinguish between two or more elements. Thus, reference to the first and second elements does not mean that only two elements can be adopted or the first element needs to precede the second element in a certain form.

Furthermore, "means" in the configuration of each device described above may be replaced by "unit", "circuit", "device" or the like.

As long as "include", "including" and transformation of them are used in the present disclosure, those terms are intended to be comprehensive like the term "comprising". Further, the term "or" used in the present disclosure is intended not to be exclusive OR.

In the present disclosure, when articles, such as "a", "an", and "the" in English, for example, are added by translation, the present disclosure may include that nouns following such articles are plural.

In the present disclosure, the term "A and B are different" may mean that "A and B are different from each other". Note that this term may mean that "A and B are different from C". The terms such as "separated" and "coupled" may be also interpreted in the same manner.

REFERENCE SIGNS LIST

100 . . . conversation unit, 200 . . . user terminal, 101 . . . conversation unit, 102 . . . conversation processing unit, 103 . . . determination unit, 104 . . . supplemental information generation unit, 105 . . . conversation information database, 106 . . . graph database, 107 . . . property list table, 100a . . . conversation information generation device, 103a . . . determination unit, 104a . . . supplemental information generation unit

The invention claimed is:

1. A conversation information generation device comprising:
a memory configured to structurally store graph data that describes nodes representing a plurality of registered words, using edge information that indicates a mutual relationship; and
processing circuitry configured to automatically
extract a word from text information to be supplemented;
determine whether the word is a specific word needed to be supplemented on the basis of another registered word associated by the relationship information from a registered word corresponding to the extracted word among the plurality of registered words stored in the memory;
when the word is determined as the specific word, reference the memory and generate supplemental information for supplementing the word on the basis of the relationship information deriving from the registered word coinciding with the word and of another registered word,
store, in a conversation information database, text information being conversation information in response to speech information transmitted from a user terminal;
acquire speech information transmitted from a user terminal, acquire text information being conversation information in response to the speech information from the conversation information database, and transmit the information,
extract a word from the acquired text information, and transmit the conversation information and the supplemental information to the user terminal.

2. The conversation information generation device according to claim 1, further comprising:
a history database configured to store a history of speech words contained in the speech information transmitted from the user terminal, wherein
when determining the specific word, the determination unit does not determine a word coinciding with the speech word as the specific word.

3. The conversation information generation device according to claim 2, further comprising:
a property list table associating a relationship word associated by predetermined relationship information, a supplemental information template for generating supplemental information, and a property list indicating relationship information for supplementation for deriving a supplemental word to be inserted to the supplemental information template, wherein
the processing circuitry
extracts, from the memory, a relationship word associated by the predetermined relationship information from a registered word coinciding with the word,
extracts, from the property list table, the property list and the supplemental information template corresponding to the relationship word,
extracts, as the supplemental word, the registered word stored in the memory and based on the relationship information for supplementation specified by the property list, and
inserts the extracted supplemental word to the template and thereby generates supplemental information.

4. The conversation information generation device according to claim 2, wherein the processing circuitry references the memory, and when the word is associated by the relationship information from a predetermined number or less of registered words, determines the word as the specific word.

5. The conversation information generation device according to claim 1, wherein
the conversation information generation device is configured to be accessible to a conversation information database storing a predetermined primary word and text information being conversation information to be provided to a user terminal in association with each other,
the processing circuitry
extracts a word from the text information stored in the conversation information database, and
adds the generated supplemental information to the conversation information database.

6. The conversation information generation device according to claim 5, wherein the processing circuitry adds the supplemental information to the text information stored in the conversation information database and from which the word is extracted.

7. The conversation information generation device according to claim 6, further comprising:
a property list table associating a relationship word associated by predetermined relationship information, a supplemental information template for generating supplemental information, and a property list indicating relationship information for supplementation for deriving a supplemental word to be inserted to the supplemental information template, wherein
the processing circuitry
extracts, from the memory, a relationship word associated by the predetermined relationship information from a registered word coinciding with the word,
extracts, from the property list table, the property list and the supplemental information template corresponding to the relationship word, extracts, as the supplemental word, the registered word stored in the memory and based on the relationship information for supplementation specified by the property list, and inserts the extracted supplemental word to the template and thereby generates supplemental information.

8. The conversation information generation device according to claim 6, wherein the processing circuitry references the memory, and when the word is associated by the relationship information from a predetermined number or less of registered words, determines the word as the specific word.

9. The conversation information generation device according to claim 5, further comprising:

a property list table associating a relationship word associated by predetermined relationship information, a supplemental information template for generating supplemental information, and a property list indicating relationship information for supplementation for deriving a supplemental word to be inserted to the supplemental information template, wherein the processing circuitry extracts, from the memory, a relationship word associated by the predetermined relationship information from a registered word coinciding with the word, extracts, from the property list table, the property list and the supplemental information template corresponding to the relationship word, extracts, as the supplemental word, the registered word stored in the memory and based on the relationship information for supplementation specified by the property list, and inserts the extracted supplemental word to the template and thereby generates supplemental information.

10. The conversation information generation device according to claim 5, wherein the processing circuitry references the memory, and when the word is associated by the relationship information from a predetermined number or less of registered words, determines the word as the specific word.

11. The conversation information generation device according to claim 1, further comprising:

a property list table associating a relationship word associated by predetermined relationship information, a supplemental information template for generating supplemental information, and a property list indicating relationship information for supplementation for deriving a supplemental word to be inserted to the supplemental information template, wherein the processing circuitry extracts, from the memory, a relationship word associated by the predetermined relationship information from a registered word coinciding with the word, extracts, from the property list table, the property list and the supplemental information template corresponding to the relationship word, extracts, as the supplemental word, the registered word stored in the memory and based on the relationship information for supplementation specified by the property list, and inserts the extracted supplemental word to the template and thereby generates supplemental information.

12. The conversation information generation device according to claim 11, wherein the processing circuitry references the memory, and when the word is associated by the relationship information from a predetermined number or less of registered words, determines the word as the specific word.

13. The conversation information generation device according to claim 1, wherein the processing circuitry references the memory, and when the word is associated by the relationship information from a predetermined number or less of registered words, determines the word as the specific word.

14. The conversation information generation device according to claim 1, further comprising:

a property list table associating a relationship word associated by predetermined relationship information, a supplemental information template for generating supplemental information, and a property list indicating relationship information for supplementation for deriving a supplemental word to be inserted to the supplemental information template, wherein the processing circuitry extracts, from the memory, a relationship word associated by the predetermined relationship information from a registered word coinciding with the word, extracts, from the property list table, the property list and the supplemental information template corresponding to the relationship word, extracts, as the supplemental word, the registered word stored in the memory and based on the relationship information for supplementation specified by the property list, and inserts the extracted supplemental word to the template and thereby generates supplemental information.

15. The conversation information generation device according to claim 1, wherein the processing circuitry references the memory, and when the word is associated by the relationship information from a predetermined number or less of registered words, determines the word as the specific word.

16. The conversation information generation device according to claim 1, wherein one node information is explained by other node information using edge information.

17. The conversation information generation device according to claim 16, wherein the edge information is information that indicates the relationship between node information.

18. The conversation information generation device according to claim 17, wherein the edge information includes a derivation direction, and the information is such that the derived node information explains the originating node information.

19. The conversation information generation device according to claim 18, wherein the processing circuitry, based on the said derivation direction, determines specific words.

* * * * *